United States Patent
Lee et al.

(10) Patent No.: US 9,642,061 B2
(45) Date of Patent: May 2, 2017

(54) APPARATUS AND METHOD FOR ACCESS PROBE HANDOFF

(71) Applicant: Intel Corporation, Santa Clara, CA (US)

(72) Inventors: Anthony Lee, San Diego, CA (US); Guotong Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 523 days.

(21) Appl. No.: 14/079,345

(22) Filed: Nov. 13, 2013

(65) Prior Publication Data

US 2014/0146793 A1      May 29, 2014

Related U.S. Application Data

(60) Provisional application No. 61/729,787, filed on Nov. 26, 2012.

(30) Foreign Application Priority Data

Aug. 30, 2013   (CN) .......................... 2013 1 0389563

(51) Int. Cl.
   *H04W 4/00*       (2009.01)
   *H04W 36/30*      (2009.01)
(52) U.S. Cl.
   CPC .................. *H04W 36/30* (2013.01)
(58) Field of Classification Search
   CPC .................................................. H04W 36/30
   (Continued)

(56) References Cited

U.S. PATENT DOCUMENTS

| | | | | |
|---|---|---|---|---|
| 5,287,545 A | * | 2/1994 | Kallin | ................... H04W 16/06 455/510 |
| 2004/0027991 A1 | * | 2/2004 | Jang | ...................... H04L 1/1671 370/230 |

(Continued)

OTHER PUBLICATIONS

"Machine to Machine communications on cdma2000", Qualcomm, Apr. 16, 2012.*

(Continued)

*Primary Examiner* — Peter Cheng
(74) *Attorney, Agent, or Firm* — Forefront IP Lawgroup of Christie and Rivera, PLLC (57) ABSTRACT

A mobile communication device for access probe handoff is provided. In the mobile communication device, a wireless module performs wireless transmissions and receptions to and from a first cellular station and a second cellular station, and a controller module configures the mobile communication device to operate in a selective retransmission mode, and detects that a signal quality of the first cellular station is less than a predetermined threshold during an access sub-attempt to the first cellular station via the wireless module. Also, the controller module hands off the mobile communication device from the first cellular station to the second cellular station in response to detecting that the signal quality of the first cellular station is less than a predetermined threshold, and clears a physical layer buffer and restarts a selective acknowledgement (SACK) operation for the selective retransmission mode after the handoff of the mobile communication device.

18 Claims, 5 Drawing Sheets

(58) Field of Classification Search
USPC .......................................................... 370/332
See application file for complete search history.

(56) References Cited

U.S. PATENT DOCUMENTS

| 2005/0025192 | A1* | 2/2005 | Jang ...................... | H04L 7/041 |
| | | | | 370/503 |
| 2012/0202557 | A1* | 8/2012 | Olofsson .............. | H04W 24/08 |
| | | | | 455/525 |

OTHER PUBLICATIONS

"Proposed text changes to support Selective ACK for REACH", Jing Sun, Qualcomm, available on Jun. 4, 2012.*

* cited by examiner

APPARATUS AND METHOD FOR ACCESS PROBE HANDOFF

CROSS REFERENCE TO RELATED APPLICATIONS

This application claims the benefit of U.S. Provisional Application No. 61/729,787, filed on Nov. 26, 2012, the entirety of which is incorporated by reference herein. This application claims the benefit of China Application No. 201310389563.X, filed on Aug. 30, 2013, the entirety of which is incorporated by reference herein.

BACKGROUND OF THE INVENTION

Field of the Invention

The invention generally relates to access probe handoff, and more particularly, to access probe handoff of a mobile communication device operating in a selective retransmission mode.

Description of the Related Art

With growing demand for ubiquitous computing and networking, various wireless technologies have been developed, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA2000) technology, High Rate Packet Data (HRPD) technology, Time Division-Synchronous Code Division Multiple Access (TD-SCDMA) technology, Worldwide Interoperability for Microwave Access (Wi-MAX) technology, Long Term Evolution (LTE) technology, and Time-Division LTE (TD-LTE) technology, etc.

Figure 1:
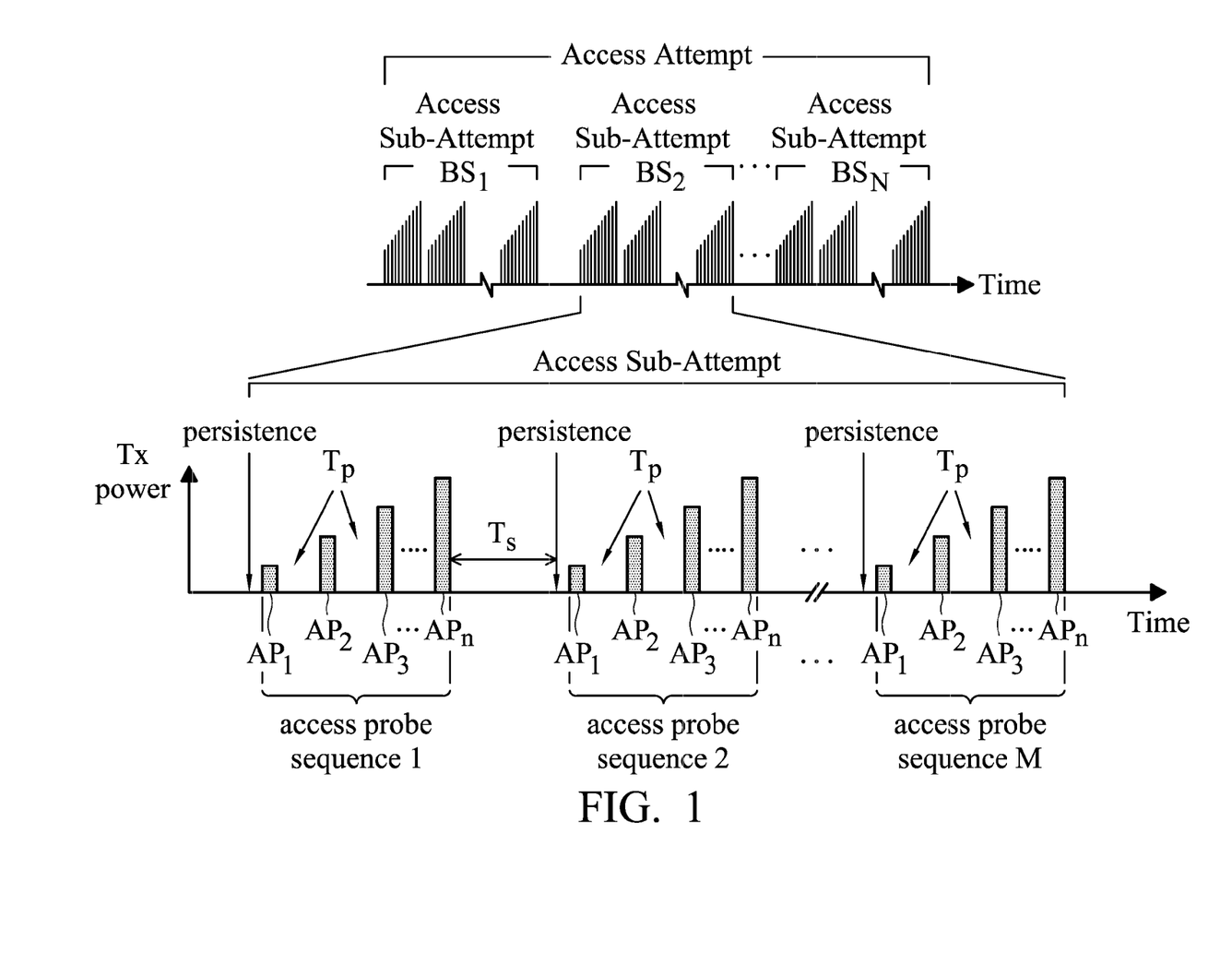
FIG. 1 is a schematic diagram illustrating an access attempt of a general MS which is not configured to operate in the selective retransmission mode.

Taking the CDMA2000 technology for example, a Mobile Station (MS) should perform an access attempt when data transmissions and/or receptions are required. FIG. 1 is a schematic diagram illustrating an access attempt of a general MS which is not configured to operate in the selective retransmission mode. An access attempt includes N access sub-attempts, wherein each access sub-attempt is associated with a respective Base Station (BS) and includes M access probe sequences. Within each access probe sequence, the MS first performs a persistence check to see if another MS is transmitting data to the BS on the access channel. If there is not such a MS, the MS transmits an access probe with an initial transmission power. Subsequently, the MS waits for an acknowledgement for the access probe for a period of time (denoted as $T_p$). If no acknowledgement for the access probe is received during $T_p$, the MS increases the transmission power and uses the increased transmission power to retransmit the access probe. The retransmission of the access probe is repeated using incremental transmission power until an acknowledgement for the access probe is received or a maximum number of retries (denoted as n) is reached. If no acknowledgement for the access probe is received during an access probe sequence, the MS further holds for another period of time (denoted as $T_s$) and then initiates another access probe sequence.

However, according to the Third Generation Partnership Project 2 (3GPP2) specifications C.S0005-F and C.S0002-F, the access probe handoff is not allowed for an MS if the MS is configured to operate in a selective retransmission mode, i.e., when the selective acknowledgement (SACK) operation is applied. With this restriction, the MS has to stay in the same BS during an access attempt even if the forward link quality of the BS becomes very poor. Although the MS keeps retransmitting the access probe to the BS during the access attempt, success is unlikely due to the poor forward link quality of the BS. As a result, the MS may end up not being in service for a long time.

BRIEF SUMMARY OF THE INVENTION

In order to solve the aforementioned problem, the invention proposes to allow the access probe handoff during an access attempt for the MS operating in the selective retransmission mode.

In one aspect of the invention, a mobile communication device for access probe handoff is provided. The mobile communication device comprises a wireless module and a controller module. The wireless module performs wireless transmissions and receptions to and from a first cellular station and a second cellular station. The controller module configures the mobile communication device to operate in a selective retransmission mode, and detects that a signal quality of the first cellular station is less than a predetermined threshold during an access sub-attempt to the first cellular station via the wireless module. Also, the controller module hands off the mobile communication device from the first cellular station to the second cellular station in response to detecting that the signal quality of the first cellular station is less than a predetermined threshold, and clears a physical layer buffer and restarts a SACK operation for the selective retransmission mode after the handoff of the mobile communication device.

In another aspect of the invention, a method for access probe handoff by a mobile communication device is provided. The method comprises the steps of: configuring the mobile communication device to operate in a selective retransmission mode; detecting that a signal quality of a first cellular station is less than a predetermined threshold during an access sub-attempt to the first cellular station; handing off from the first cellular station to a second cellular station in response to detecting that the signal quality of the first cellular station is less than a predetermined threshold; and clearing a physical layer buffer and restarting a SACK operation for the selective retransmission mode after the handoff from the first cellular station to the second cellular station.

In another aspect of the invention, a mobile communication device for access probe handoff is provided. The mobile communication device comprises a wireless module and a controller module. The wireless module performs wireless transmissions and receptions to and from a first cellular station and a second cellular station. The controller module configures the mobile communication device to operate in a selective retransmission mode in which a SACK operation is linked with a respective access sub-attempt, and detects that a signal quality of the first cellular station is less than a predetermined threshold during an access sub-attempt to the first cellular station via the wireless module. Also, the controller module hands off the mobile communication device from the first cellular station to the second cellular station to initiate another access sub-attempt to the second cellular station via the wireless module, in response to detecting that the signal quality of the first cellular station is less than a predetermined threshold.

In another aspect of the invention, a method for access probe handoff by a mobile communication device is provided. The method comprises the steps of: configuring the mobile communication device to operate in a selective retransmission mode in which a SACK operation is linked with a respective access sub-attempt; detecting that a signal quality of a first cellular station is less than a predetermined threshold during an access sub-attempt to the first cellular station; and handing off from the first cellular station to a second cellular station to initiate another access sub-attempt to the second cellular station, in response to detecting that the signal quality of the first cellular station is less than a predetermined threshold.

Other aspects and features of the invention will become apparent to those with ordinary skill in the art upon review of the following descriptions of specific embodiments of the mobile communication devices and the methods for access probe handoff.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments might be realized in software, hardware, firmware, or any combination thereof. The 3GPP2 specifications described herein are used to teach the spirit of the invention, and the invention is not limited thereto.

Figure 2:
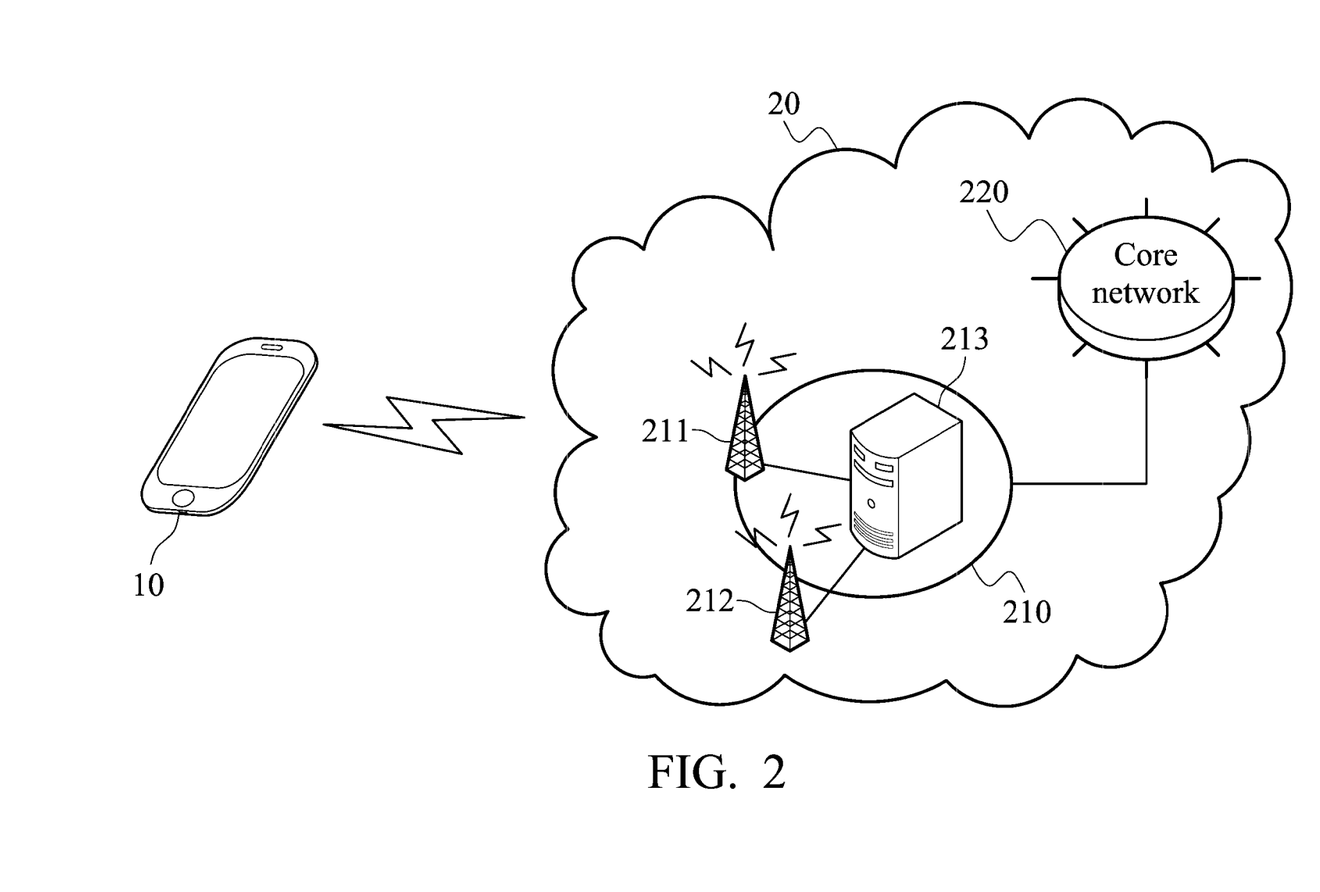
FIG. 2 is a block diagram illustrating a mobile communication environment according to an embodiment of the invention.

FIG. 2 is a block diagram illustrating a mobile communication environment according to an embodiment of the invention. In the mobile communication environment, the mobile communication device 10 wirelessly communicates with the service network 20 via an air interface. Although shown as a smart phone, the mobile communication device 10 may be any computing device, such as a panel Personal Computer (PC), a laptop computer, or others, which supports at least the wireless technology utilized by the service network 20. In one embodiment, the mobile communication device 10 may be configured as a Machine-to-Machine (M2M) device for M2M communications. In another embodiment, the mobile communication device may be a normal device, i.e., a non-M2M device, for non-M2M communications, such as voice and/or data services. The service network 20 comprises a radio access network 210 and a core network 220, wherein the radio access network 210 is responsible for processing radio signals, terminating radio protocols, and connecting the mobile communication device 10 with the core network 220. The radio access network 210 comprises at least two cellular stations 211 and 212 and a cellular station controller 213. The cellular stations 211 and 212 are controlled by the cellular station controller 213 and are responsible for providing wireless transceiving functionality for the service network 20. Specifically, each of the cellular stations 211 and 212 generally serves one cell or multiple logical sectors. The cellular station controller 213 is responsible for controlling the operation of the cellular stations 211 and 212, i.e., managing radio resources, radio parameters, and interfaces for the cellular stations 211 and 212. The core network 220 is responsible for performing mobility management, network-side authentication, and interfaces with public networks.

In one embodiment, the service network 20 may be a CDMA2000 system (including 1× Radio Transmission Technology (RTT), 1× Evolution-Data Optimized (EV-DO) Release 0/A/B/C, and 1× EV-DO Rev D/E/F). Each of the cellular stations 211 and 212 may be a Base Transceiver Station (BTS) or a base station, and the cellular station controller 213 may be a Base Station Controller (BSC). The core network 220 may comprise a Circuit-Switched (CS) domain and a Packet-Switched (PS) domain, wherein the CS domain may comprise several network entities, such as a Mobile Switching Center (MSC), Media Gateway (MGW), Media Resource Function Processor (MRFP), Signaling Gateway (SGW), Service Control Point (SCP), and Home Location Register (HLR), and the PS domain may comprise a Packet Data Service Node (PDSN) and Authentication Authorization Accounting (AAA) servers. It is to be understood that, the CDMA2000 system is merely an illustrative example, and other wireless communication networks utilizing any future technology of the CDMA2000 technology family may be used instead, and the invention is not limited thereto.

Figure 3:
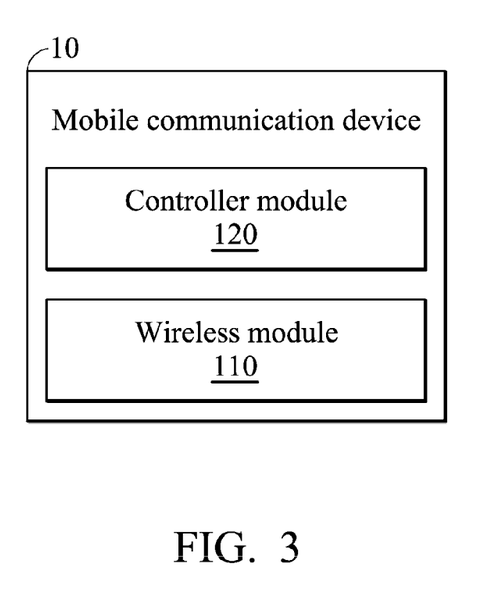
FIG. 3 is a block diagram illustrating the mobile communication device 10 according to an embodiment of the invention.

FIG. 3 is a block diagram illustrating the mobile communication device 10 according to an embodiment of the invention. The mobile communication device 10 comprises a wireless module 110 and a controller module 120, wherein the wireless module 110 is configured to perform the functionality of wireless transceiving and the controller module 120 is configured to control the operation of the wireless module 110 for performing the method for access probe handoff in the present invention. To further clarify, the wireless module 110 may comprise a Radio Frequency (RF) unit, and the controller module 120 may comprise a general-purpose processor or Micro-Control Unit (MCU) of a baseband unit, or called a baseband processor. The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 800 MHz, 1900 MHz, or 2400 MHz utilized in CDMA2000 technology, or others depending on the wireless technology in use. Although not shown, the mobile communication device 10 may further comprise other functional components, such as a display unit and/or keypad serving as the Man-Machine Interface (MMI), a storage unit storing the program codes of applications and/or communication protocol(s), or others.

Figure 4:
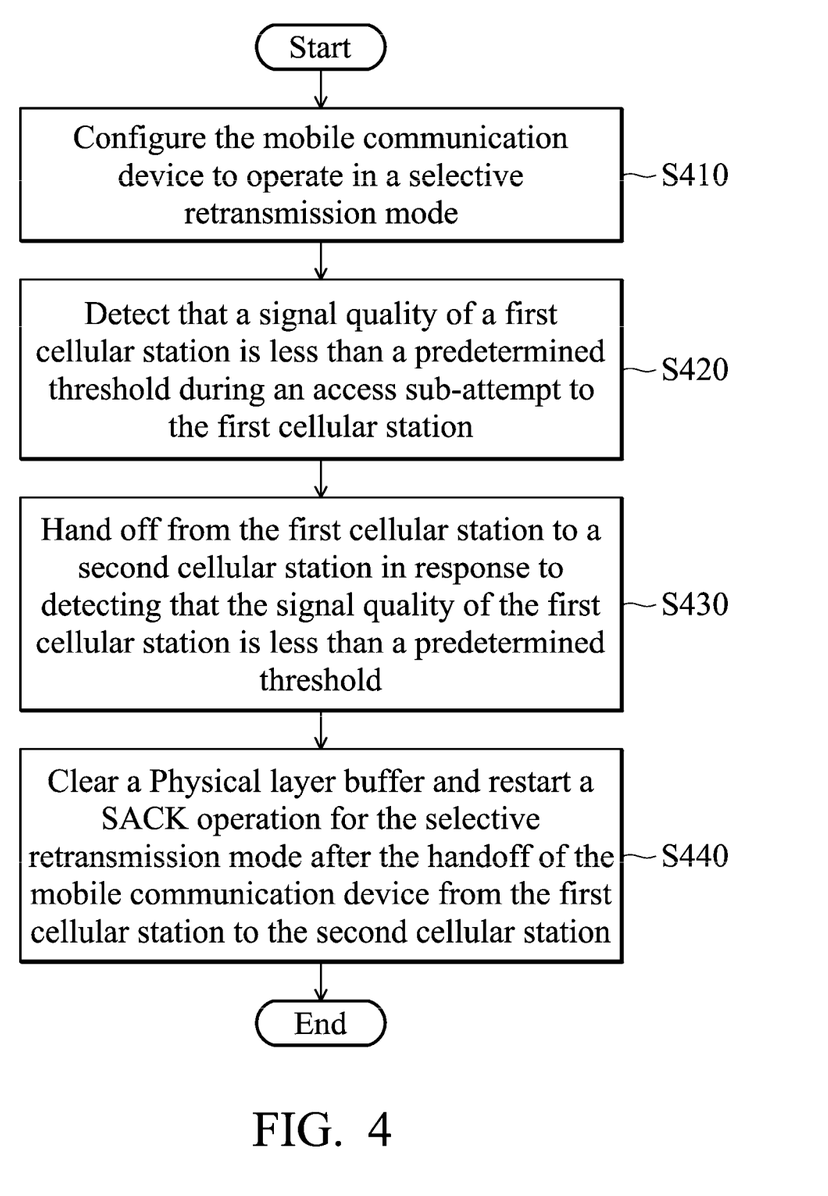
FIG. 4 is a flow chart illustrating the method for access probe handoff according to an embodiment of the invention.

FIG. 4 is a flow chart illustrating the method for access probe handoff according to an embodiment of the invention. To begin, the mobile communication device is configured to operate in the selective retransmission mode (step S410). In other words, the SACK operation is applied for the mobile communication device during an access attempt. Next, the mobile communication device detects that a signal quality of a first cellular station is less than a predetermined threshold during an access sub-attempt to the first cellular station (step S420). That is, the mobile communication device is camped on the first cellular station to perform the access sub-attempt, and then detects a low signal quality of the first cellular station.

In response to detecting that the signal quality of the first cellular station is less than a predetermined threshold, the mobile communication device hands off from the first cellular station to a second cellular station (step S430). After the handoff of the mobile communication device from the first cellular station to the second cellular station, the mobile communication device clears the physical layer buffer and restarts the SACK operation for the selective retransmission mode (step S440). Specifically, the clearing of the physical layer buffer and the restarting of the SACK operation are performed for initiating another access sub-attempt to the second cellular station, wherein the access sub-attempts to the first cellular station and the second cellular station are within the same access attempt. The physical layer buffer refers to the buffer of the physical layer of the communication protocol in use between the mobile communication device and the service network to which the first and second cellular stations belong.

The access attempt may be initiated for sending an Origination Message, a Reconnect Message, a Call Recovery Request Message, or a Page Response Message to the first cellular station or the second cellular station, and the mobile communication device is in a Page Response Substate or a Mobile Station Origination Attempt Substate.

It is noted that, unlike the conventional 3GPP2 specification C.S0005-F, in the embodiment of FIG. 4, the access probe handoff is allowed during an access attempt for the MS operating in the selective retransmission mode, without impairing correct functioning of the SACK operation.

Figure 5:
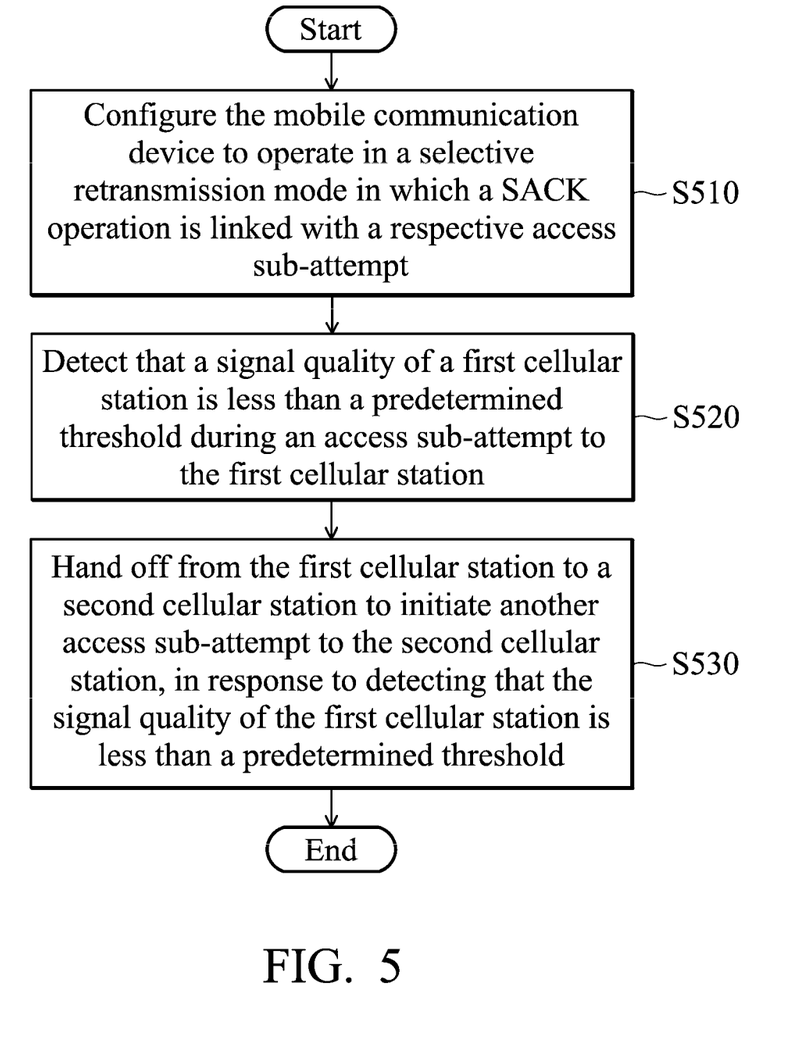
FIG. 5 is a flow chart illustrating the method for access probe handoff according to another embodiment of the invention.

FIG. 5 is a flow chart illustrating the method for access probe handoff according to another embodiment of the invention. To begin, the mobile communication device is configured to operate in the selective retransmission mode in which the SACK operation is linked with a respective access sub-attempt (step S510). That is, the SACK operation is applied for the mobile communication device during an access sub-attempt. Next, the mobile communication device detects that a signal quality of a first cellular station is less than a predetermined threshold during an access sub-attempt to the first cellular station (step S520). That is, the mobile communication device is camped on the first cellular station to perform the access sub-attempt, and then detects a low signal quality of the first cellular station.

In response to detecting that the signal quality of the first cellular station is less than a predetermined threshold, the mobile communication device hands off from the first cellular station to the second cellular station to initiate another access sub-attempt to the second cellular station (step S530). Specifically, the access sub-attempts to the first cellular station and the second cellular station are within the same access attempt. That is, the access probe handoff is allowed during an access attempt for the MS operating in the selective retransmission mode, without impairing correct functioning of the SACK operation.

The access attempt may be initiated for sending an Origination Message, a Reconnect Message, a Call Recovery Request Message, or a Page Response Message to the first cellular station or the second cellular station, and the mobile communication device is in a Page Response Substate or a Mobile Station Origination Attempt Substate.

It is noted that, unlike the conventional 3GPP2 specification C.S0005-F, the SACK operation is linked with a respective access sub-attempt in this embodiment, so that the physical layer buffer will be cleared and the SACK operation will be restarted for the access sub-attempt to the second cellular station after the handoff.

In addition, if an Enhanced Access Channel (EACH) Selective Acknowledgement Order is received from the second cellular station after the handoff, the mobile communication device may retransmit the EACH data frames which are indicated by the EACH Selective Acknowledgement Order as not having been successfully received by the second cellular station. It is noted that, unlike the conventional 3GPP2 specification C.S0002-F, the SACK codes contained in the EACH Selective Acknowledgement Order and the EACH data frames are used for identifying specific access sub-attempt instead of access attempt, due to the fact that the SACK operation is linked with a respective access sub-attempt.

While the invention has been described by way of example and in terms of preferred embodiment, it is to be understood that the invention is not limited thereto. Those who are skilled in this technology can still make various alterations and modifications without departing from the scope and spirit of this invention. For example, the method for access probe handoff may be applied to mobile communication devices and cellular stations that are in compliance with any evolutionary technology of the CDMA2000 technology. Therefore, the scope of the invention shall be defined and protected by the following claims and their equivalents.

What is claimed is:

1. A mobile communication device for access probe handoff, comprising:
 a transceiver unit configured to perform wireless transmissions and receptions to and from a first cellular station or a second cellular station; and
 a processor configured to: set the mobile communication device to operate in a selective retransmission mode, wherein an access sub-attempt in the selective retransmission mode is initiated for sending an origination message or a page response message to the First cellular station; detect that a signal quality of the first cellular station is less than a predetermined threshold during the access sub-attempt to the first cellular station, wherein the detected signal quality that is less than the predetermined threshold denotes a failure of a paging channel from the First cellular station;
 performing probe-handing off, wherein the probe-handling off comprises handing off the mobile communication device from the first cellular station with the failed paging channel to the second cellular station with signal quality that is at least equal to the predetermined threshold, wherein the failure of the paging channel from the first cellular station occurs before the mobile communication device receives an acknowledgement to the origination message or the page response message from the first cellular station; and clear a physical layer buffer for the selective retransmission mode after the probe-handing off, wherein communications between the mobile communication device and the first and second cellular stations are in compliance with a communication protocol of Communication Division Multiple Access 2000 (CDMA 2000) and 1× Evolution-Data Optimized (EV-DO) Revision F technology.

2. The mobile communication device of claim 1, wherein the access sub-attempts to the first cellular station and the second cellular station are within the same access attempt.

3. The mobile communication device of claim 2, wherein the access attempt in the selective retransmission mode includes sending a Reconnect Message, or a Call Recovery Request Message.

4. The mobile communication device of claim 1 further comprising: restarting a selective acknowledgement (SACK) operation for the selective retransmission mode after the probe-handing off the page and access channel.

5. The mobile communication device of claim 1, wherein the Code Division Multiple Access 2000 (CDMA2000) defines the access probe handoff as the handoff of the paging and access channels when there is paging channel failure before the mobile communication device receives the acknowledgement to the origination or the page response.

6. A method for access probe handoff by a mobile communication device, comprising:
configuring the mobile communication device to operate in a selective retransmission mode prior to an access sub-attempt to a first or a second cellular station, wherein the access sub-attempt in the selective retransmission mode is initiated for sending an origination message or a page response message to the first or the second cellular station;
detecting that a signal quality of the first cellular station is less than a predetermined threshold during the access sub-attempt to the first cellular station, wherein the detected signal quality that is less than the predetermined threshold denotes a failure of a paging channel from the first cellular station;
handing off the mobile communication device from the first cellular station to the second cellular station in response to detecting that the signal quality of the first cellular station is less than the predetermined threshold, wherein the failure of the paging channel occurs before the mobile communication device receives an acknowledgement to the origination message or the page response message from the first cellular station; and
clearing a physical layer buffer and restarting a selective acknowledgement (SACK) operation for the selective retransmission mode after the handoff from the first cellular station to the second cellular station, wherein communications between the mobile communication device and the first and second cellular stations are in compliance with a communication protocol of Communication Division Multiple Access 2000 (CDMA 2000) and 1× Evolution-Data Optimized (EV-DO) Revision F technology.

7. The method of claim 6, wherein the clearing of the physical layer buffer and the restarting of the SACK operation are performed for the access sub-attempt to the second cellular station, and the access sub-attempts to the first cellular station and the second cellular station are within the same access attempt.

8. The method of claim 7, wherein the access sub-attempt in the selective retransmission mode is further initiated for sending a Reconnect Message, or a Call Recovery Request Message to the first cellular station or the second cellular station.

9. The method of claim 6, wherein the SACK operation corresponds to the selective retransmission mode.

10. The method of claim 6, wherein the Code Division Multiple Access 2000 (CDMA2000) defines the access probe handoff as the handoff of the paging and access channels when there is paging channel failure before the mobile communication device receives the acknowledgement to the origination or the page response.

11. A mobile communication device for access probe handoff, comprising:
a transceiver unit configured to send an origination message or a page response message to each base station in a plurality of base stations to initiate an access sub-attempt with the each base station, the access sub-attempt comprises a comparison between a signal quality of the each base station and a predetermined threshold; and
a processor configured to: set the mobile communication device to operate in a selective retransmission mode; detect that the signal quality of the each base station is less than the predetermined threshold, wherein the detected signal quality that is less than the predetermined threshold denotes a failure of a paging channel from the each base station;
performing probe-handing off, wherein the probe-handing off comprises handing off the mobile communication device from the each base station with the failed paging channel to an other base station with signal quality that is at least equal to the predetermined threshold, wherein the failure of the paging channel from the each base station occurs before the mobile communication device receives an acknowledgement to the origination message or the page response message from the each base station; and clear a physical layer buffer for the selective transmission mode after the probe-handing off, wherein communications between the mobile communication device and the each base station is in compliance with a communication protocol of Communication Division Multiple Access 2000 (CDMA 2000) and 1× Evolution-Data Optimized (EV-DO) Revision F technology.

12. The mobile communication device of claim 11, wherein the physical layer buffer of the mobile communication device is cleared after the probe-handoff from the base station with the signal quality that is less than the predetermined threshold to the other base station with the signal quality that is at least equal to the predetermined threshold.

13. The mobile communication device of claim 12, wherein the processor further receives an Enhanced Access Channel (EACH) Selective Acknowledgement Order from the other base station, and retransmits EACH data frames that include a specific identification of the access sub-attempt by the mobile communication device.

14. The mobile communication device of claim 11, wherein the Code Division Multiple Access 2000 (CDMA2000) defines the probe-handing-off as the handoff of the paging and access channels when there is paging channel failure before the mobile communication device receives the acknowledgement to the origination or the page response.

15. A method for access probe handoff by a mobile communication device, comprising:

configuring the mobile communication device to operate in a selective retransmission mode in which a selective acknowledgement (SACK) operation is performed for each access sub-attempt by the mobile communication device of a first or a second cellular station, wherein the each access sub-attempt in the selective retransmission mode is initiated for sending an origination message or a page response message to the first or the second cellular station;

detecting that a signal quality of the first cellular station is less than a predetermined threshold during an access sub-attempt to the first cellular station, wherein the detected signal quality that is less than the predetermined threshold denotes a failure of a paging channel from the first cellular station;

performing probe-handing off, the probe-handing off comprising handing off the mobile communication device from the first cellular station to the second cellular station in response to detecting that the signal quality of the first cellular station is less than the predetermined threshold, wherein the failure of the paging channel from the first cellular station occurs before the mobile communication device receives an acknowledgement to the origination message or the page response message from the first cellular station; and clearing a physical layer buffer and restarting the SACK operation for the selective retransmission mode after the handoff from the first cellular station to the second cellular station, wherein communications between the mobile communication device and the first and second cellular stations are in compliance with a communication protocol of Communication Division Multiple Access 2000 (CDMA 2000) and 1× Evolution-Data βOptimized (EV-DO) Revision F technology.

16. The method of claim 15, wherein the physical layer buffer of the mobile communication device is cleared after the probe-handoff from the first cellular station with the signal quality that is less than the predetermined threshold to the second cellular station with the signal quality that is at least equal to the predetermined threshold.

17. The method of claim 15, further comprising:
receiving an Enhanced Access Channel (EACH) Selective Acknowledgement Order from the second cellular station; and
retransmitting EACH data frames, which are indicated by the EACH Selective Acknowledgement Order as not having been successfully received by the second cellular station, to the second cellular station,
wherein the EACH Selective Acknowledgement Order and the EACH data frames comprise the same SACK code for identifying the another access sub-attempt to the second cellular station.

18. The method of claim 15, wherein the Code Division Multiple Access 2000 (CDMA2000) defines the probe-handing-off as the handoff of the paging and access channels when there is paging channel failure before the mobile communication device receives the acknowledgement to the origination or the page response.

* * * * *